(12) United States Patent
Stemmer et al.

(10) Patent No.: US 10,232,742 B2
(45) Date of Patent: Mar. 19, 2019

(54) VEHICLE SEAT HAVING AN ADJUSTING DEVICE

(71) Applicant: Adient Luxembourg Holding S.à.r.l., Luxembourg (LU)

(72) Inventors: Juergen Stemmer, Remscheid (DE); Susanne Nuding, Bergisch Gladbach (DE)

(73) Assignee: ADIENT LUXEMBOURG HOLDING S.À.R.L., Luxembourg (LU)

( * ) Notice: Subject to any disclaimer, the term of this patent is extended or adjusted under 35 U.S.C. 154(b) by 0 days.

(21) Appl. No.: 15/568,594

(22) PCT Filed: Apr. 22, 2016

(86) PCT No.: PCT/EP2016/059002
§ 371 (c)(1),
(2) Date: Oct. 23, 2017

(87) PCT Pub. No.: WO2016/170110
PCT Pub. Date: Oct. 27, 2016

(65) Prior Publication Data
US 2018/0154800 A1 Jun. 7, 2018

(30) Foreign Application Priority Data
Apr. 24, 2015 (DE) .................. 10 2015 207 609

(51) Int. Cl.
*B60N 2/16* (2006.01)
*B60N 2/68* (2006.01)
(Continued)

(52) U.S. Cl.
CPC ............... *B60N 2/168* (2013.01); *B60N 2/10* (2013.01); *B60N 2/165* (2013.01); *B60N 2/167* (2013.01);
(Continued)

(58) Field of Classification Search
CPC .......... B60N 2/168; B60N 2/938; B60N 2/10; B60N 2/165; B60N 2/167; B60N 2/1675; B60N 2/169; B60N 2/682
(Continued)

(56) References Cited

U.S. PATENT DOCUMENTS 8,720,661 B2   5/2014  Karthaus
8,882,198 B2 *  11/2014  Gillis .................... F16H 31/002
                                                297/344.12
(Continued)

FOREIGN PATENT DOCUMENTS

DE   295 21 946 U1   11/1998
DE   100 52 234 A1    5/2002
(Continued)

*Primary Examiner* — Anthony D Barfield
(74) *Attorney, Agent, or Firm* — McGlew and Tuttle, P.C.

(57) ABSTRACT

A vehicle seat (1) has an adjusting device (40) for adjusting a relative position between a first component (24) and a second component (30) of the vehicle seat (1). The adjusting device (40) has a locking device (50) for locking the adjusting device (40) by a friction fit between a brake ring (60) and at least one brake element (70) of the adjusting device (40). The brake ring (60) is directly connected to the first component (24) or directly connected to the second component (30).

14 Claims, 3 Drawing Sheets

(51) Int. Cl.
*B60N 2/90* (2018.01)
*B60N 2/10* (2006.01)

(52) U.S. Cl.
CPC ........... *B60N 2/169* (2013.01); *B60N 2/1675* (2013.01); *B60N 2/682* (2013.01); *B60N 2/938* (2018.02)

(58) Field of Classification Search
USPC ................................................... 297/344.12
See application file for complete search history.

(56) References Cited

U.S. PATENT DOCUMENTS

2013/0207431 A1    8/2013  Haida et al.
2015/0231994 A1*   8/2015  Benjamin ............ B60N 2/1615
                                              297/344.12

FOREIGN PATENT DOCUMENTS

| | | |
|---|---|---|
| DE | 10 2005 056 978 A1 | 5/2007 |
| EP | 0 479 449 A1 | 4/1992 |
| EP | 1 864 851 A1 | 12/2007 |
| WO | 2014/057091 A1 | 4/2014 |
| WO | 2014/084653 A1 | 6/2014 |
| WO | 2014/207201 A1 | 12/2014 |
| WO | 2015/032639 A1 | 3/2015 |

\* cited by examiner

VEHICLE SEAT HAVING AN ADJUSTING DEVICE

CROSS REFERENCE TO RELATED APPLICATIONS

This application is a United States National Phase Application of International Application PCT/EP2016/059002, filed Apr. 22, 2016, and claims the benefit of priority under 35 U.S.C. § 119 of German Application 10 2015 207 609.1, filed Apr. 24, 2015, the entire contents of which are incorporated herein by reference.

FIELD OF THE INVENTION

The invention relates to a vehicle seat having an adjusting device for adjusting a relative position between a first component and a second component of the vehicle seat, in particular a relative position between a first component of a seat height adjustment kinematic arrangement and a second component of the seat height adjustment kinematic arrangement, wherein the adjusting device has a securing device for blocking the adjusting device by means of frictional engagement between a brake ring and at least one brake element of the adjusting device.

BACKGROUND OF THE INVENTION

Adjusting devices known from the prior art have a securing device which ensures a blocking of the adjusting device by means of frictional engagement between a brake ring and brake elements. The blocking is canceled only when an adjustment of the vehicle seat is initiated by the user.

Such adjusting devices are known, for example, from WO 2014/057091 A1 and WO 2014/207201 A1.

SUMMARY OF THE INVENTION

An object of the invention is to improve a vehicle seat having an adjusting device mentioned in the introduction, in particular to reduce the weight and the costs of a corresponding vehicle seat. In particular, the structural space of the vehicle seat in the transverse direction is intended to be reduced.

As a result of the fact that the brake ring is directly connected to the first component or directly connected to the second component, in particular welded and/or adhesively bonded to the first component or to the second component, it is possible to dispense with an adapter or a connection plate for securing the adjusting device. The term "directly connected" is intended to be understood to mean a connection of components which are arranged one on the other, wherein an intermediate layer of welding material or adhesive is possible. The adjusting device does not have to have any adapter for securing the adjusting device to the first component or for securing to the second component. The weight and the costs of the vehicle seat are thereby reduced. In addition, the structural space of the vehicle seat is reduced in a transverse direction. A direct integration of the adjusting device in the seat structure of the vehicle seat is produced. Direct integration means in particular that a common component is a component of the seat structure and the adjusting device.

The operating method of the adjusting device may correspond to the adjusting devices known from the documents WO 2014/057091 A1 and WO 2014/207201 A1 whose content in this regard is expressly incorporated herein.

The brake ring may be constructed to be open. The term open is intended to mean that between an output shaft and the brake ring or between a pinion and the brake ring there is arranged an opening which is greater than a fit. The brake ring may be constructed to be closed so that an inner space of the adjusting device is sealed by the brake ring. The term closed is intended to mean in particular that between an output shaft and the brake ring or between a pinion and the brake ring there is arranged no opening which is greater than a clearance fit.

The adjusting device may be used to adjust a seat height adjustment kinematic arrangement of the vehicle seat. The first component may be a rear rocker arm of a seat height adjustment kinematic arrangement. The second component may be a seat frame.

The adjusting device may be used to adjust a seat inclination adjustment kinematic arrangement of the vehicle seat.

Preferably, the brake ring is secured to the seat frame by means of a welding method, in particular by means of laser welding. Preferably, the brake ring is secured to a side component of the seat frame. The brake ring may alternatively or additionally be adhesively bonded to the seat frame. Alternatively or additionally, securing by means of blind riveting or pressing is also possible. In principle, all joining techniques which are known to a person skilled in the art and which require no additional component may be considered.

The adjusting device may have a securing device for blocking the adjusting device by means of frictional engagement and may additionally have a blocking unit for the form-fit locking of the adjusting device. The locking unit prevents run-off, that is to say, undesired adjustment of the adjusting device.

The adjusting device may translate a discontinuous movement of an actuation element into a continuous rotational movement of a pinion. The term "discontinuous movement" is in this instance intended to be understood to be an alternating pivoting of the actuation element in two opposing directions, often also referred to as a pumping action. The term "continuous movement" is intended in this instance to be understood to mean that the pinion rotates in only one rotation direction. In this instance, the rotational speed may vary. Preferably, a first type of a discontinuous movement brings about a rotation of the pinion in a first rotation direction, and a second type of a discontinuous movement brings about a rotation of the pinion in a second rotation direction.

The brake elements may be constructed as rolling members. The brake elements may be constructed as rollers. The adjusting device may have three roller pairs. The brake elements may alternatively also be constructed as balls.

A securing device may be a clamping member freewheel whose basic principle is known, for example, from DE 10 2005 056 978 A1. A clamping ring is consequently also intended to be understood to be a brake ring. A clamping element is consequently also intended to be understood to be a brake element. The clamping elements may preferably become wedged between the clamping ring and an output.

The securing device may perform two functions. On the one hand, driving a seat height adjustment kinematic arrangement or a seat inclination adjustment kinematic arrangement and, on the other hand, play-free blocking of the seat height adjustment kinematic arrangement or the seat inclination adjustment kinematic arrangement into which torques are introduced during permanent operation or in the event of an accident.

The invention is explained in greater detail below with reference to advantageous embodiments illustrated in the figures. However, the invention is not limited to these embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
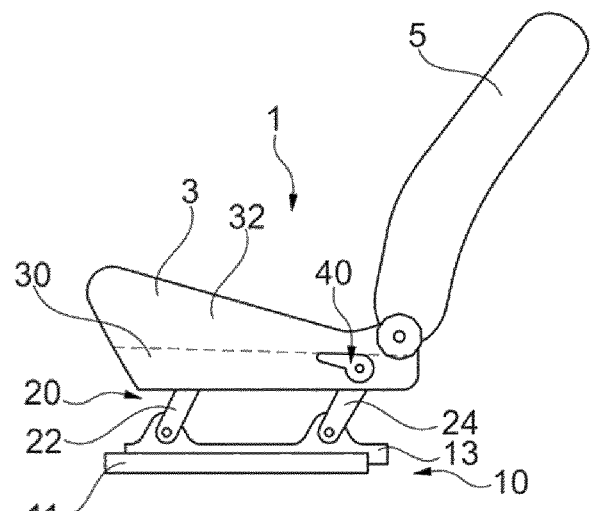
FIG. 1 is a schematic side view of a vehicle seat, having a seat height adjustment kinematic arrangement and an adjusting device for adjusting the seat height of the vehicle seat.

Referring to the drawings, a vehicle seat 1 which is illustrated schematically in FIG. 1 has a seat member 3 and a backrest 5. The vehicle seat 1 has for changing the longitudinal seat position a longitudinal adjuster 10 which is arranged below the seat member 3. The longitudinal adjuster 10 has, when viewed in the transverse direction, a seat rail pair 11, 13 at each of the two sides of the vehicle seat 1, respectively. Each seat rail pair 11, 13 comprises a first seat rail 11 which can be connected to the vehicle structure and a second seat rail 13 which is secured to the seat member structure. The first seat rail 11 and the second seat rail 13 engage around each other alternately in a manner known per se and are supported on each other so as to be able to be displaced in a longitudinal direction relative to each other.

A seat height adjustment kinematic arrangement 20 of the vehicle seat 1 has at both vehicle seat sides a four-bar linkage which is formed by a base, in this instance a second rail 13, a front rocker arm 22, a rear rocker arm 24 and a seat frame 30. The second rail 13, the front rocker arm 22, the rear rocker arm 24 and the seat frame 30 are each connected to each other by means of rotary articulations with respect to the four-bar linkage. The seat frame 30 carries a seat cushion upholstery 32 and in this instance also the backrest 5. In this instance, the rear rocker arm 24 is connected in an articulated manner to a rail adapter 15 of the second rail 13. By means of the seat height adjustment kinematic arrangement 20, the height of the seat cushion upholstery 32—and in this instance at the same time of the backrest 5—of the vehicle seat 1 above the vehicle floor and above the second seat rail 13 can be adjusted.

In order to drive and lock the seat height adjustment kinematic arrangement 20, that is to say, in order to adjust and block a relative position between a first component and a second component of the seat height adjustment kinematic arrangement 20, an adjusting device 40, in particular precisely one adjusting device 40, is provided. In this instance, the first component is a rear rocker arm 24 and the second component is the seat frame 30. In this instance, the adjusting device 40 serves to adjust and block a relative position between the rear rocker arm 24 and the seat frame 30 of the seat height adjustment kinematic arrangement 20 and consequently the height of the seat cushion upholstery 32. If the adjusting device 40 is actuated, it pivots the rear rocker arm 24 and the seat frame 30 relative to each other.

The adjusting device 40 has a securing device 50 for blocking the adjusting device 40. The securing device 50 has a brake ring 60 and a plurality of, in this instance circular-cylindrical, brake elements 70. Such a securing device 50 may be a clamping roller freewheel which is known per se. A frictional engagement can be produced between the brake ring 60 and the brake elements 70. The securing device 50 secures in the secured state a pinion 80 which is in toothed engagement with a tooth arrangement of the rear rocker arm 24. The brake ring 60 is arranged in a kinematically secure, that is to say, non-movable, manner relative to the seat frame 30. The brake ring 60 is arranged directly on the seat frame 30. The brake ring 60 is secured to the seat frame 30.

Figure 2:
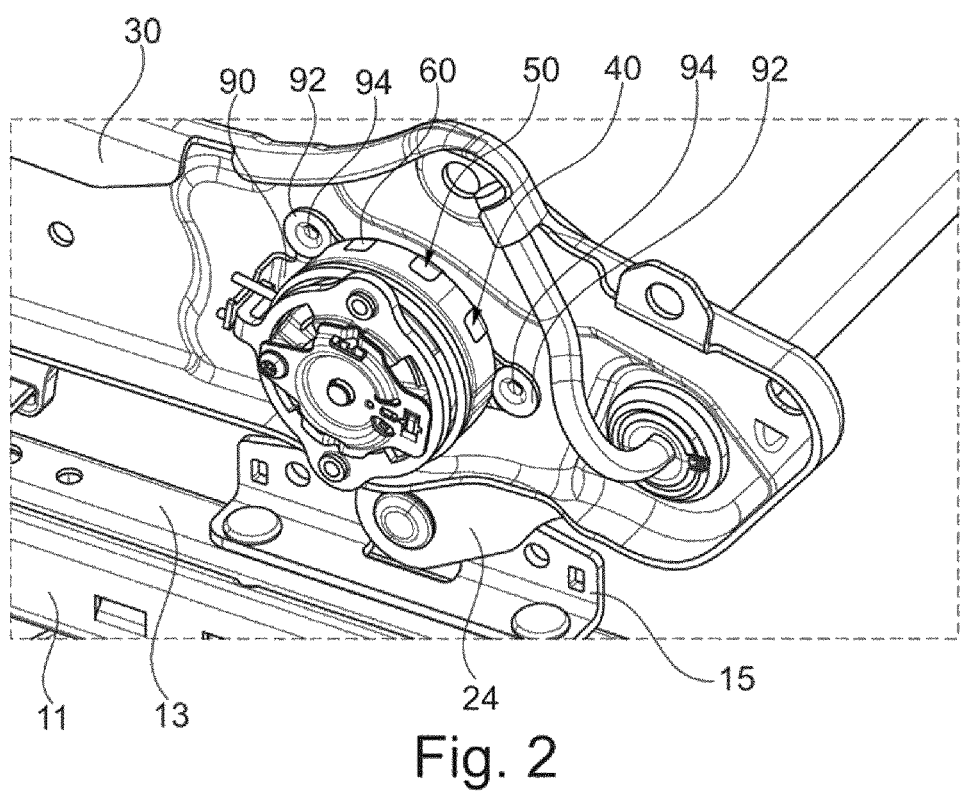
FIG. 2 is a perspective cutout of a vehicle seat known from the prior art with a seat height adjustment kinematic arrangement and an adjusting device for adjusting the seat height of the vehicle seat.
Figure 3:
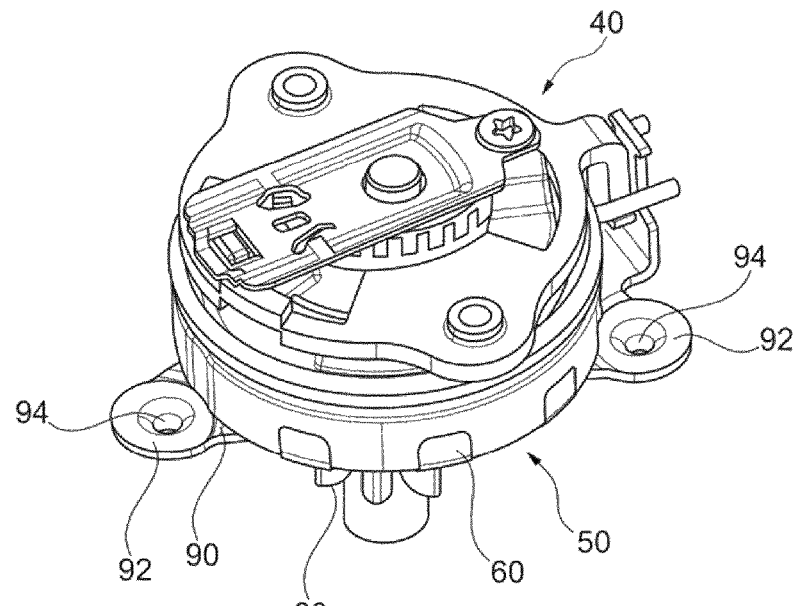
FIG. 3 is a perspective view of the adjusting device of the vehicle seat from FIG. 2.

FIGS. 2 and 3 show an adjusting device 40 known from the prior art. The brake ring 60 is screwed to the seat frame 30 by means of an adapter 90, in this instance a connection plate. To this end, the connection plate 90 has three securing flaps 92 each with a through-hole 94. The adjusting device 40 is securely connected to the seat frame 30 by means of securing means not illustrated in FIGS. 2 and 3, preferably screws or rivets. The term "securely connected" is intended to be understood by a person skilled in the art to mean that no relative displacement or relative rotation is possible.

Figure 4:
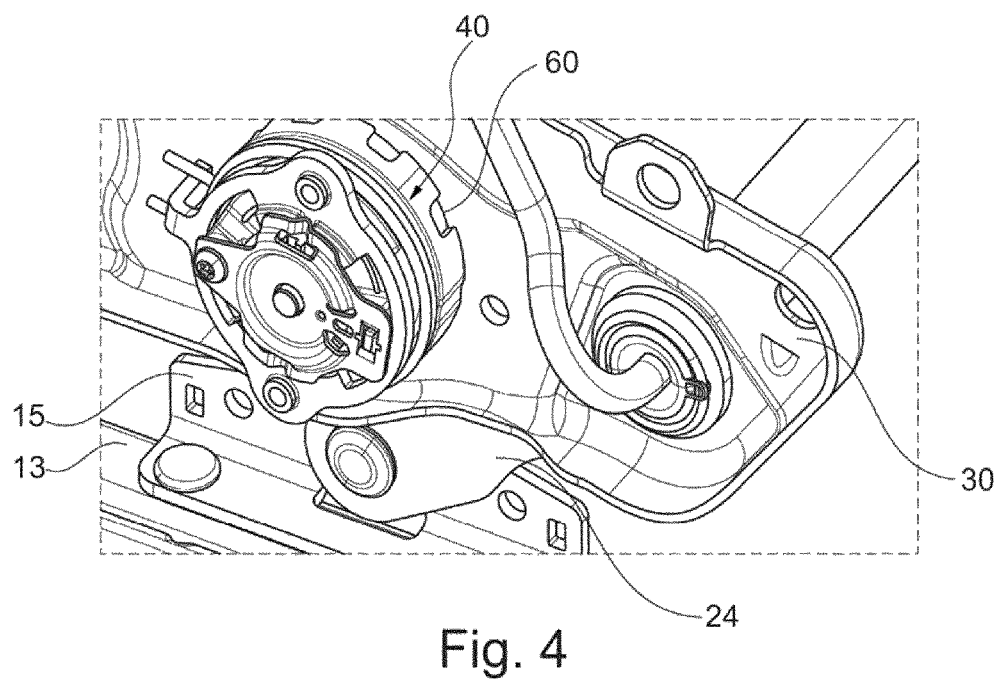
FIG. 4 is a perspective cutout of a first embodiment of a vehicle seat according to the invention with a seat height adjustment kinematic arrangement and an adjusting device for adjusting the seat height of the vehicle seat.

FIG. 4 is a cutout of a first embodiment of a vehicle seat 1 according to the invention. A brake ring 60 of an adjusting device 40 is securely connected directly to the seat frame 30, preferably welded and/or adhesively bonded to the seat frame 30. With respect to the prior art described above, the adapter 90 is consequently dispensed with. The brake ring 60 cooperates with brake elements 70 which are constructed as rollers. Three arrangements of two brake elements 70 in each case are arranged in a uniform manner over the periphery. The brake elements 70 which are constructed as rollers are in abutment with the brake ring 60 when viewed in a radial direction at the outer side. When viewed in a radial direction, the brake elements 70 are in abutment at the inner side with a component of the adjusting device 40 which is connected to a pinion 80 in a rotationally secure manner. The pinion 80 acts as an output of the adjusting device 40.

Figure 5:
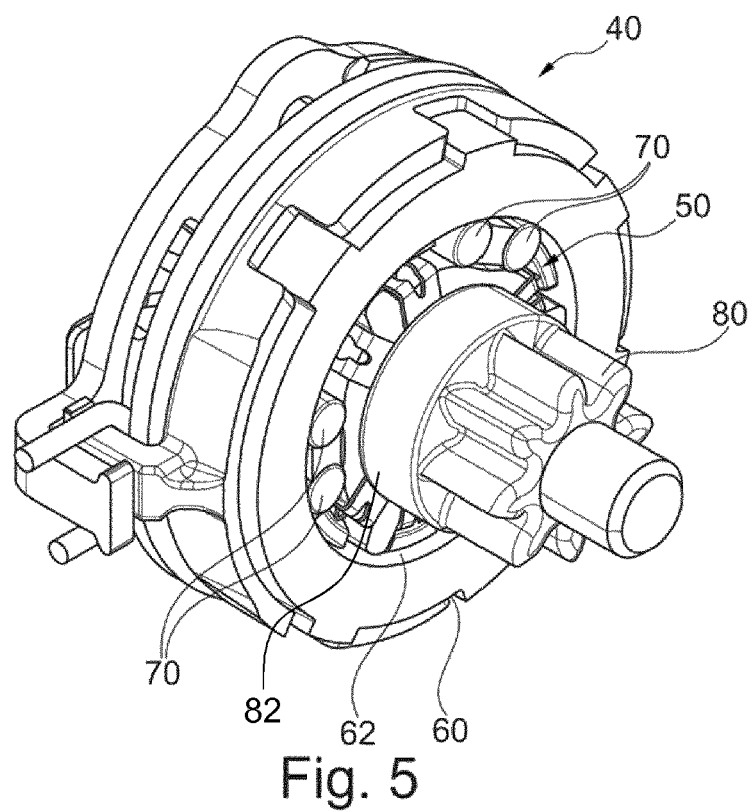
FIG. 5 is a perspective view of the adjusting device of the vehicle seat from FIG. 4.

FIG. 5 shows the adjusting device 40 of the first embodiment. The brake ring 60 has a pot-like basic shape which has a hole 62 at the center. The pinion 80 extends through the hole 62. The diameter of the hole 62 is significantly larger than a diameter of a circular-cylindrical base 82 of the pinion 80 so that between an outer contour of the base 82 and an edge of the hole 62 there is a peripheral gap. The width of the gap in a radial direction is greater than a diameter of the brake elements 70.

Figure 6:
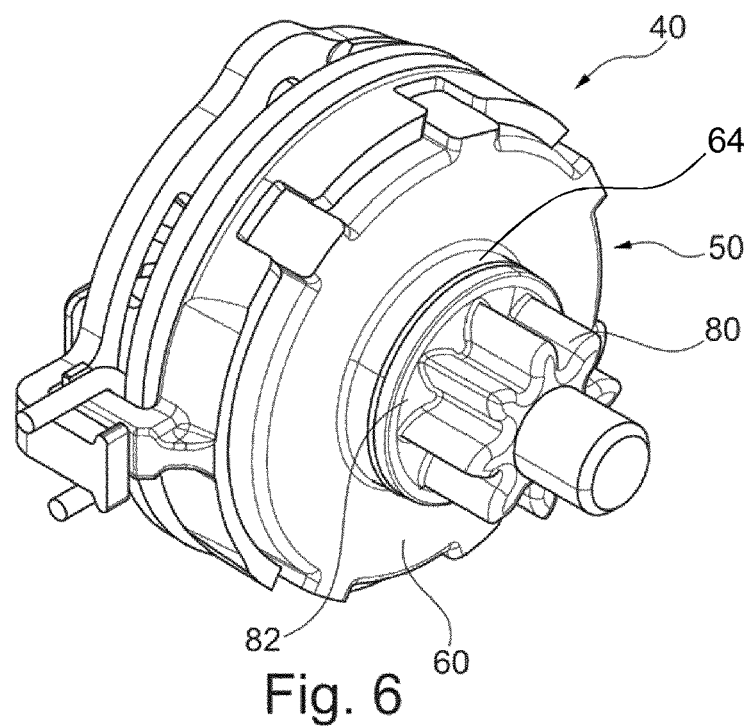
FIG. 6 is a perspective view of an adjusting device of a second embodiment of a vehicle seat according to the invention.

FIG. 6 shows an adjusting device 40 of a second embodiment which corresponds to the first embodiment with the exception of a brake ring 60 which will be described below. The brake ring 60 of the second embodiment has a circular-cylindrical extruded collar 64. A base 82 of a pinion 80 extends through the extruded collar 64. The diameter of the extruded collar 64 corresponds to the diameter of the base 82 of the pinion 80. In this instance, a circular-cylindrical base 82 of the pinion 80 is arranged in the extruded collar 64 with a clearance fit. The brake ring 60 of the adjusting device 40 is securely connected directly to the seat frame 30, preferably welded and/or adhesively bonded to the seat frame 30.

Although the invention has been described in detail in the drawings and the above description, the illustrations are intended to be understood to be illustrative and exemplary and not limiting. In particular, the selection of the proportions of the individual elements which are illustrated in the drawings are not intended to be interpreted to be necessary or limiting. Furthermore, the invention is in particular not limited to the embodiments explained. Other variants of the invention and the implementation thereof will be appreciated by a person skilled in the art from the above disclosure, the figures and the patent claims.

Terms used in the patent claims, such as "comprise", "have", "include", "contain" and the like do not exclude other elements or steps. The use of the indefinite article does not exclude a plurality.

While specific embodiments of the invention have been shown and described in detail to illustrate the application of the principles of the invention, it will be understood that the invention may be embodied otherwise without departing from such principles.

The invention claimed is:

1. A vehicle seat comprising:
   a first component;
   a second component; and
   an adjusting device for adjusting a relative position between the first component and the second component, wherein the adjusting device comprises a securing device comprising a brake ring, and at least one brake element, the securing device blocking the adjusting device by frictional engagement between the brake ring and the at least one brake element of the adjusting device, wherein the brake ring is directly connected to the first component or directly connected to the second component and the brake ring has a pot shape and is welded and/or adhesively bonded directly to the first component or to the second component.

2. The vehicle seat as claimed in claim 1, wherein the adjusting device adjusts the seat height adjustment kinematic arrangement.

3. The vehicle seat as claimed in claim 1, further comprising a seat height adjustment kinematic arrangement wherein the first component is a rear rocker arm of the seat height adjustment kinematic arrangement, and the second component is a seat frame.

4. The vehicle seat as claimed in claim 1, wherein the brake ring is welded to the first component or to the second component by a laser weld.

5. The vehicle seat as claimed in claim 1, wherein the brake ring is constructed to be open.

6. The vehicle seat as claimed in claim 1, wherein the brake ring is constructed to be closed.

7. The vehicle seat as claimed in claim 1, wherein the adjusting device further comprises a blocking unit for a form-fit locking of the adjusting device.

8. The vehicle seat as claimed in claim 1, further comprising an actuation element and a pinion, wherein the adjusting device translates a discontinuous movement of the actuation element into a continuous rotational movement of the pinion.

9. The vehicle seat as claimed in claim 1, wherein the at least one brake element is configured as a rolling member.

10. The vehicle seat as claimed in claim 9, wherein the at least one brake element configured as a roller.

11. The vehicle seat as claimed in claim 9, wherein at least one brake element is configured as a ball.

12. The vehicle seat as claimed in claim 1, wherein the adjusting device has three roller pairs.

13. The vehicle seat as claimed in claim 1, wherein the brake ring is a clamping ring and in the brake element is a clamping element.

14. The vehicle seat as claimed in claim 13, wherein the securing device is a clamping member freewheel.

\* \* \* \* \*